United States Patent
Lujan Moreno et al.

(10) Patent No.: US 7,797,329 B2
(45) Date of Patent: Sep. 14, 2010

(54) METHOD AND SYSTEM FOR ENABLING A SYNCHRONIZATION-FREE AND PARALLEL COMMIT PHASE

(75) Inventors: Miguel Angel Lujan Moreno, Mountain View, CA (US); Phyllis E. Gustafson, Pleasanton, CA (US); Michael H. Paleczny, San Jose, CA (US); Christopher A. Vick, San Jose, CA (US); Jay R. Freeman, Palo Alto, CA (US); Olaf Manczak, Hayward, CA (US)

(73) Assignee: Oracle America Inc., Redwood City, CA (US)

( * ) Notice: Subject to any disclaimer, the term of this patent is extended or adjusted under 35 U.S.C. 154(b) by 305 days.

(21) Appl. No.: 11/450,763

(22) Filed: Jun. 9, 2006

(65) Prior Publication Data

US 2008/0005498 A1    Jan. 3, 2008

(51) Int. Cl.
   *G06F 7/00* (2006.01)
   *G06F 17/30* (2006.01)
   *G06F 9/44* (2006.01)
   *G06F 9/45* (2006.01)

(52) U.S. Cl. .................. 707/758; 717/119; 717/140; 717/141; 717/151; 717/159; 717/149; 707/705

(58) Field of Classification Search .................. 707/202
   See application file for complete search history.

(56) References Cited

U.S. PATENT DOCUMENTS

| | | | | |
|---|---|---|---|---|
| 5,263,156 A | * | 11/1993 | Bowen et al. ............... | 707/202 |
| 5,499,367 A | * | 3/1996 | Bamford et al. ............. | 707/8 |
| 5,692,184 A | * | 11/1997 | Ardoin et al. ............. | 707/103 R |
| 5,717,883 A | * | 2/1998 | Sager ..................... | 712/218 |
| 5,832,272 A | * | 11/1998 | Kalantery ................. | 717/149 |
| 5,960,436 A | * | 9/1999 | Chang et al. .............. | 707/101 |
| 6,490,594 B1 | * | 12/2002 | Lomet .................... | 707/200 |
| 6,732,124 B1 | * | 5/2004 | Koseki et al. ............. | 707/202 |
| 7,103,597 B2 | * | 9/2006 | McGoveran ................ | 707/8 |
| 7,168,612 B2 | * | 1/2007 | Montgomery et al. ........ | 235/379 |
| 7,555,500 B2 | * | 6/2009 | Pederson et al. ........... | 707/202 |
| 2002/0103804 A1 | * | 8/2002 | Rothschild et al. ......... | 707/10 |

(Continued)

OTHER PUBLICATIONS

Rauchwerger, Lawrence; "Run-Time Parallelization: It's Time Has Come"; Department of Computer Science, Texas A&M University, College Station, Texas; vol. 24, No. 304; 1998 (26 pages).

(Continued)

*Primary Examiner*—Mohammad Ali
*Assistant Examiner*—Griselle Corbo
(74) *Attorney, Agent, or Firm*—Osha • Liang LLP

(57) ABSTRACT

A method for committing memory transactions in an application that includes executing a plurality of sections of the application in parallel, logging a plurality of memory transactions that occur while executing the plurality of sections to obtain a plurality of logs and a plurality of temporary results, wherein the plurality of memory transactions that includes a plurality of writes to at least one memory location, comparing the plurality of logs to identify an optimal list of writes from the plurality of writes, and committing memory transactions corresponding to a subset of the plurality of temporary results, wherein the subset of the plurality of temporary results is identified by the optimal list of writes.

19 Claims, 6 Drawing Sheets

U.S. PATENT DOCUMENTS

| | | | | |
|---|---|---|---|---|
| 2004/0068501 | A1* | 4/2004 | McGoveran | 707/8 |
| 2004/0199548 | A1* | 10/2004 | Miller | 707/201 |
| 2005/0188364 | A1* | 8/2005 | Cockx et al. | 717/159 |
| 2005/0192989 | A1* | 9/2005 | Adiba et al. | 707/101 |
| 2006/0271930 | A1* | 11/2006 | Letizi et al. | 718/1 |
| 2007/0130238 | A1* | 6/2007 | Harris et al. | 707/206 |
| 2007/0136290 | A1* | 6/2007 | Shinnar et al. | 707/8 |
| 2007/0136365 | A1* | 6/2007 | Tarditi et al. | 707/103 R |
| 2007/0143276 | A1* | 6/2007 | Harris | 707/4 |
| 2007/0143360 | A1* | 6/2007 | Harris et al. | 707/202 |
| 2007/0143741 | A1* | 6/2007 | Harris | 717/121 |
| 2007/0169030 | A1* | 7/2007 | Tarditi et al. | 717/140 |
| 2007/0169031 | A1* | 7/2007 | Harris | 717/140 |
| 2007/0174185 | A1* | 7/2007 | McGoveran | 705/39 |
| 2007/0198979 | A1* | 8/2007 | Dice et al. | 718/100 |

OTHER PUBLICATIONS

Dang et al.; "The R-LRPD Test: Speculative Parallelization of Partially Parallel Loops"; Department of Computer Science, Texas A&M University, College Station, TX; IEEE Computer Society; 2002; (11 pages).

Cintra, et al.; "Toward Efficient and Robust Software Speculative Parallelization on Multiprocessors"; PPoPP'03; Jun. 11-13, 2003; pp. 13-24; (13 pages).

Bruening, et al.; "Softspec: Software-based Speculative Parallelism"; Laboratory for Computer Science, MIT, 3$^{rd}$ ACM Workshop on Feedback-Directed and Dynamic Optimization (FDDO-3), Dec. 10, 2000; (10 pages).

Chen, et al.; "An Efficient Algorithm for the Run-time Parallelization of DOACROSS Loops"; Center for Supercomputing Research and Development, University of Illinois at Urbana-Champaign, IL; IEEE; 1994; (11 pages).

Banerjee et al; "Automatic Program Parallelization"; Proceedings of the IEEE, vol. 81, No. 2, pp. 211-243, 1993; (33 pages).

Cintra et al.; "Design Space Exploration of a Software Speculative Parallelization Scheme"; IEEE Transactions on Parallel and Distributed Systems; vol. 16, No. 5, May 2005; pp. 562-576; (15 pages).

Gupta et al.; "Techniques for Speculative Run-Time Parallelization of Loops"; Supercomputing, Nov. 1998; pp. 1-12; (12 pages).

Rauchwerger et al.; "The LRPD Test: Speculative Run-Time Parallelization of Loops with Privatization and Reduction Parallelization"; IEEE Transactions on Parallel and Distributed Systems; vol. 10, No. 2, Feb. 1999; pp. 1-20; (21 pages).

* cited by examiner

METHOD AND SYSTEM FOR ENABLING A SYNCHRONIZATION-FREE AND PARALLEL COMMIT PHASE

STATEMENT REGARDING FEDERALLY SPONSORED RESEARCH OR DEVELOPMENT

The present invention was made with the support of the government of the United States under contract NBCH3039002 awarded by the Defense Advanced Research Projects Administration. The United States government may have certain rights in the present invention.

BACKGROUND

A typical distributed computer system includes multiple interconnected nodes. Each node in the distributed computer system may include a separate processor. Accordingly, applications, which execute in parallel on the distributed computer system, are able to exploit the processing power provided by interconnection of the processors. For example, by combining the processing power provided by the multiple interconnected nodes, a given computation may be executed much faster by splitting the computation into multiple sections and executing each section of the application in parallel rather than executing the application serially on a single node.

Executing an application across several nodes typically involves determining which portions of the application should be performed serially and which portions of an application may be performed in parallel (i.e., the portion is safe to be performed in parallel). A portion of the application is deemed as parallelizable if the portion may be divided into discrete sections such that each section in the discrete sections may be executed by an individual thread simultaneously. In contrast, portions of the application that when parallelized would result in dependency violations (i.e., data dependencies between threads), such as multiple reads and writes to the same memory location by different threads, are not parallelized.

After determining that data dependencies do not exist in a portion of an application, the section is executed in parallel and individual threads write the results immediately to memory. Alternatively, after parallelizing an application, the results produced by the parallel execution are stored in temporary storage. Then, the results are committed in the order that the results would be if the application were executed in serial. For example, the results from executing a loop in parallel are committed in order of the first iteration results (i.e., results created when executing the first iteration of the loop), the second iteration results, the third iteration results, etc. Thus, because results are committed in the order as if performed serially, a user is assured that the last change to a particular memory location is correct.

SUMMARY

In general, in one aspect, the invention relates to a method for committing memory transactions in an application that includes executing a plurality of sections of the application in parallel, logging a plurality of memory transactions that occur while executing the plurality of sections to obtain a plurality of logs and a plurality of temporary results, wherein the plurality of memory transactions that includes a plurality of writes to at least one memory location, comparing the plurality of logs to identify an optimal list of writes from the plurality of writes, and committing memory transactions corresponding to a subset of the plurality of temporary results, wherein the subset of the plurality of temporary results is identified by the optimal list of writes.

In general, in one aspect, the invention relates to a system for committing transactions in an application that includes a plurality of co-threads configured to execute a plurality of sections of the application in parallel, and log memory transactions that occur while executing the plurality of sections to obtain a plurality of logs and a plurality of temporary results, wherein the memory transactions comprise a plurality of writes to at least one memory location, and an evaluator configured to compare the plurality of logs to identify an optimal list of writes from the plurality of writes, and commit memory transactions corresponding to a subset of the plurality of temporary results, wherein the subset of the plurality of temporary results is identified by the optimal list of writes.

In general, in one aspect, the invention relates to a distributed computer system having a plurality of nodes for performing a method that includes executing a plurality of sections of an application in parallel by a plurality of co-threads executing on the plurality of nodes, logging memory transactions that occur while executing the plurality of sections to obtain a plurality of logs and a plurality of temporary results, wherein the memory transactions comprise a plurality of writes to at least one memory location, comparing the plurality of logs to identify an optimal list of writes from the plurality of writes, and committing memory transactions corresponding to a subset of the plurality of temporary results, wherein the subset of the plurality of temporary results is identified by the optimal list of writes.

Other aspects of the invention will be apparent from the following description and the appended claims.

DETAILED DESCRIPTION

Figure 1:
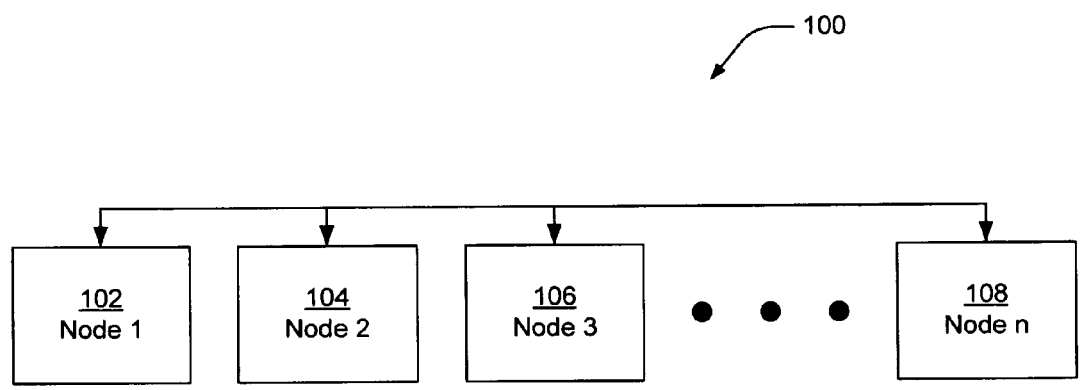
FIG. 1 shows a schematic diagram of a distributed computer system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for selecting and committing an optimal list of writes. Specifically, embodiments of the invention provide a method for identifying when multiple writes to the same memory location exist by different threads and only committing the last, correct write to the memory location. Accordingly, rather than committing all writes, only an optimal number of writes are committed. Thus, because multiple writes to the same memory location are not committed, committing the optimal list of writes may be performed in parallel in accordance with one or more embodiments of the invention. Further, embodiments of the invention provide a mechanism for identifying dependency violations when identifying the optimal list of writes. When a dependency violation is found to exist, then embodiments of the invention adjust the optimal list of writes accordingly.

FIG. 1 shows a schematic diagram of a distributed computer system in accordance with one embodiment of the invention. The distributed computer system (100) corresponds to virtually any type of interconnection of nodes (e.g., node 1 (102), node 2 (104), node 3 (106), node n (108)) in virtually any topology. For example, the nodes (e.g., node 1 (102), node 2 (104), node 3 (106), node n (108)) may be arranged in a star topology, a ring topology, or a tree topology. Alternatively, the distributed computer system (100) may correspond to multiple processors with shared memory system (i.e., each node is a processor), several interconnected servers, or a group of computers connected over the Internet. Further, the distributed computer system (100) may also include one or more subsystems (not shown), in which the subsystem is of a different type and topology than the parent system (i.e., the distributed system itself may be composed to an aggregation of other distributed systems).

In addition, the distributed computer system (100) may correspond to a multi-threaded processor. Specifically, the nodes (e.g., node 1 (102), node 2 (104), node 3 (106), node n (108)) of the distributed computer system (100) may correspond to threads that are available in the multithreaded processor.

Figure 2:
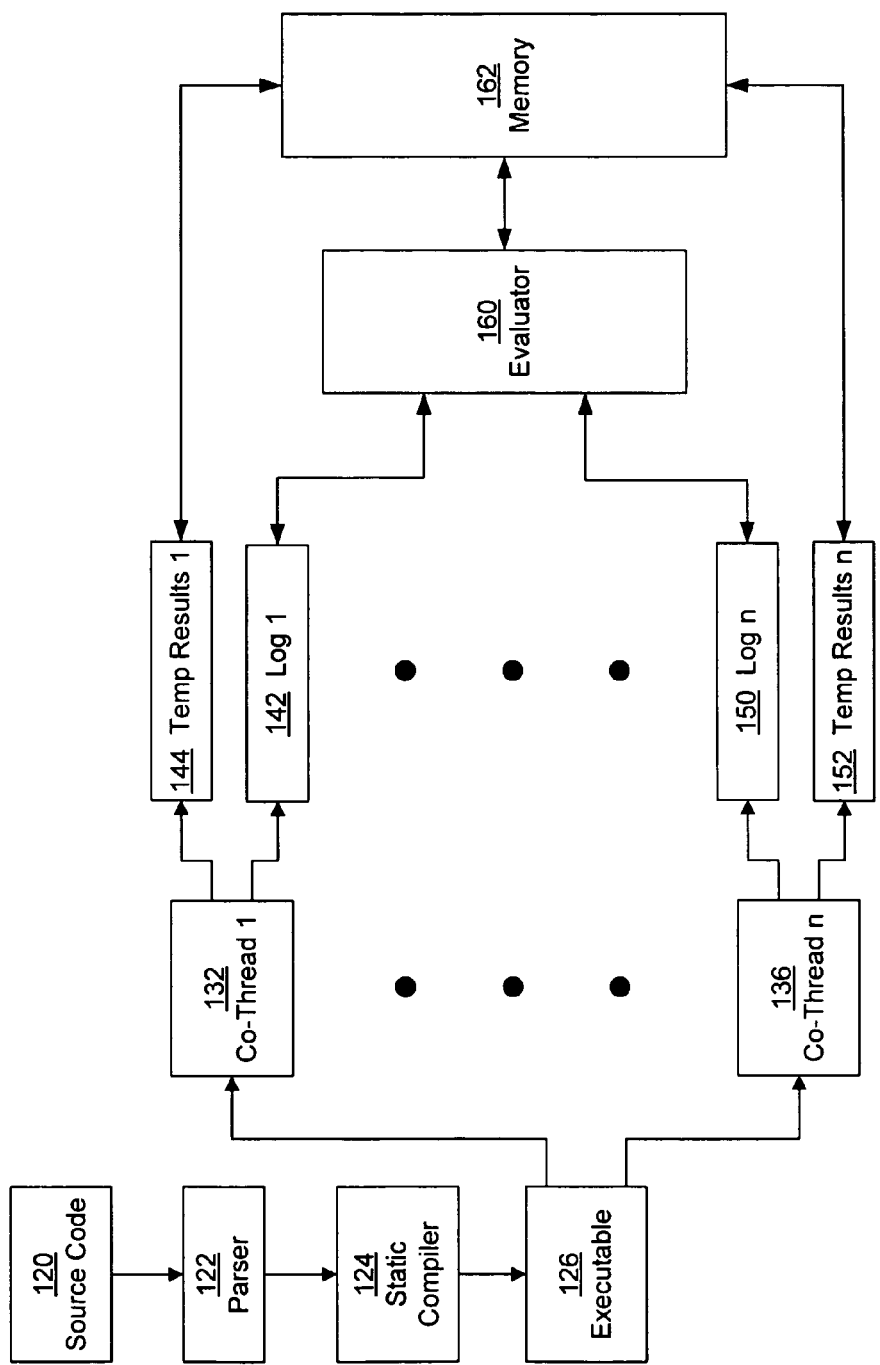
FIG. 2 shows a schematic diagram of a system for committing transactions in an application for a distributed computer system in accordance with one embodiment of the invention.

FIG. 2 shows a schematic diagram of a system for detecting dependency violations in a distributed computer system in accordance with one embodiment of the invention. The system includes source code (120), a parser (122), a static compiler (124), an executable (126), co-threads (e.g., co-thread 1 (132), co-thread n (136)), an evaluator (160), and memory (162). Each of these aforementioned components is described below.

The source code (120) in one or more embodiments of the invention, corresponds to an application or part of an application written in any programming language, such as JAVA™, C, C++, Fortran, High Performance C, High Performance Fortran, etc. The source code (120) may also include instructions for statically parallelizing the source code (120), such as instructions for Message Passing Interface (MPI), etc.

Additionally, in one or more embodiments of the invention, the source code may include optional portions (e.g., conditional expressions, function calls, etc.) one or more loops (e.g., recursive expressions, a "for" loop, a "while" loop, a "do while" loop, etc.), or any other such instructions that may allow the application to be divided into sections. A section may correspond to a branch in a conditional expression, iterations of a loop, etc. In one or more embodiments of the invention, sections of an application span a loop, iterations of a loop, an application, a portion of the application, or a conditional expression of the application when each section of the multiple sections correspond to a subset of the instructions in the loop, the iterations of the loop, the application, the portion of the application, or the conditional expression such that none of the subsets of instructions overlap.

For example, if the loop corresponds to a "for" loop that has 10 iterations, and if the first 5 iterations correspond to one section and the next 5 iterations correspond to a second section, then the two sections span the loop. As another example, with regards to conditional expressions, two sections span a conditional true/false expression when one section corresponds to the path of instructions if the conditional evaluates to true while another section corresponds to the path of instructions if the conditional evaluates to false.

Continuing with FIG. 2, in one or more embodiments of the invention, the source code (120) is associated with a parser (122). The parser (122) corresponds to a program that includes functionality to analyze the source code (120) and divide the source code (120) into parsed source code. In one or more embodiments of the invention, parsed source code may be organized and represented in a parse tree.

Associated with the parser (122), in one or more embodiments of the invention, is a static compiler (124). The static compiler (124), in one or more embodiments of the invention, corresponds to a program that includes functionality to transform parsed source code into object code or an executable file (126) which is also referred to herein as merely an "executable." In one or more embodiments of the invention, the static compiler (124) may also include functionality to perform a static analysis on the parsed source code to determine which portions of the parsed source code may be performed in parallel. Further, the static compiler (124) may include functionality to determine and flag the portions of parsed source code that may not be parallelized at compile time because of the possibility of dependency violations due to indeterminable variables.

An indeterminable variable corresponds to a variable for which memory accesses cannot be determined at compile time, such as subscripted subscripts and pointer variables. Examples of indeterminable variables include A[C[i]]=B[i] and D[i]=X in which X is a pointer variable. In accordance with one embodiment of the invention, in the aforementioned example, A[C[i]] and D[i] are indeterminable variables and, thus, cannot be parallelized at compile time.

Continuing with the discussion of FIG. 2, the executable (126) corresponds to code which may be executed by threads (e.g., co-thread 1 (132), co-thread n (136)) in the distributed computer system. In one or more embodiments of the invention, the executable (126) may correspond to byte code to be executed on a virtual machine.

Further, associated with the executable (126) may be a runtime parser (not shown) in accordance with one embodiment of the invention. The runtime parser includes functionality to parse the executable and create instrumented code which has the necessary instrumentation added for executing code in parallel. Specifically, the instrumented code specifies how to divide code into sections for individual co-threads (e.g., co-thread 1 (132), co-thread n (136)) to execute in parallel. For example, the instrumented code may specify which co-thread is responsible for executing a specific section of code. Further, in one or more embodiments of the invention, the instrumented code may also include functionality to enable co-threads executing the executable (126) to log memory accesses associated with the indeterminable variables.

In one or more embodiments of the invention, a co-thread (e.g., co-thread 1 (132), co-thread n (136)) corresponds to a set of instructions in execution. Each co-thread (e.g., co-thread 1 (132), co-thread 2 (134), co-thread n (136)) may execute in parallel with other threads (e.g., co-thread 1 (132), co-thread n (136)).

A co-thread (e.g., co-thread 1 (132), co-thread n (136)), in one or more embodiments of the invention, corresponds to a process executing in the system. Specifically, each co-thread (e.g., co-thread 1 (132), co-thread n (136)) may be configured to execute a section of the application. Associated with each co-thread (e.g., co-thread 1 (132), co-thread n (136)) is a log (e.g., log 1 (142), log n (150)) and temporary results (e.g., temp results 1 (144), temp results n (152)).

The log (e.g., log 1 (142), log n (150)), in one or more embodiments of the invention, corresponds to a data store for storing memory accesses performed during execution of the section of the application. With the memory accesses, the log (e.g., log 1 (142), log n (150)) may also have an iteration variable and/or an instruction counter specifying when the memory access occurred. In one or more embodiments of the invention, the log (e.g., log 1 (142), log n (150)) only stores the memory accesses related to the indeterminable variables.

Also each co-thread (e.g., co-thread 1 (132), co-thread n (136)) is associated with temporary results (e.g., temp results 1 (144), temp results n (152)). In one or more embodiments of the invention, the temporary results (e.g., temp results 1 (144), temp results n (152)) correspond to the results generated during the execution of the section of the application by the particular co-thread (e.g., co-thread 1 (132), co-thread n (136)). Specifically, the temporary results (e.g., temp results 1 (144), temp results n (152)) correspond to results that have been generated but are not yet committed. Committing results as used herein is consistent as understood and practiced by one skilled in the art.

In one or more embodiments of the invention, the logs (e.g., log 1 (142), log n (150)) and the temporary results (e.g., temp results 1 (144), temp results n (152)) have an inherent order. Specifically, a log and temporary results that corresponds to a section of an application that would be performed earlier than another section of the application if performed in serial are considered sequentially earlier to the log and temporary results associated with the other section. For example, logs and temporary results corresponding to the first twelve iterations of a loop are considered sequentially earlier than logs and temporary results corresponding to the last twelve iterations of a loop.

Those skilled in the art will appreciate that, for the purposes of comparing writes, the logs (e.g., log 1 (142), log n (150)) and the temporary results (e.g., temp results 1 (144), temp results n (152)) may correspond to the same data.

An evaluator (160) is connected to the logs (e.g., log 1 (142), log n (150) in accordance with one or more embodiments of the invention. An evaluator corresponds to a logical component that includes functionality to identify an optimal list of writes. An optimal list of writes corresponds to a list of writes that are not redundant (i.e., do not specify the same memory location) with respect to memory locations. For example, if a write in the optimal list of writes specifies to write to the contents of memory location X, then another write does not exist that also specifies memory location X.

The evaluator (160) may correspond to the co-threads (e.g., co-thread 1 (132), co-thread n (136)), such as after the co-threads finish executing a section of the application. Alternatively, the evaluator (160) may correspond to separate thread(s) that operate while or after the application is executed by the co-threads (e.g., co-thread 1 (132), co-thread n (136)).

Memory (162) is connected to the temporary results (e.g., temp results 1 (144), temp results n (152)) and to the evaluator (160) in accordance with one or more embodiments of the invention. Memory (162) as used herein is consistent as used and practiced by one skilled in the art. Further, a memory location as used herein corresponds to any part or subpart of memory that may be read and/or modified.

Figure 3:
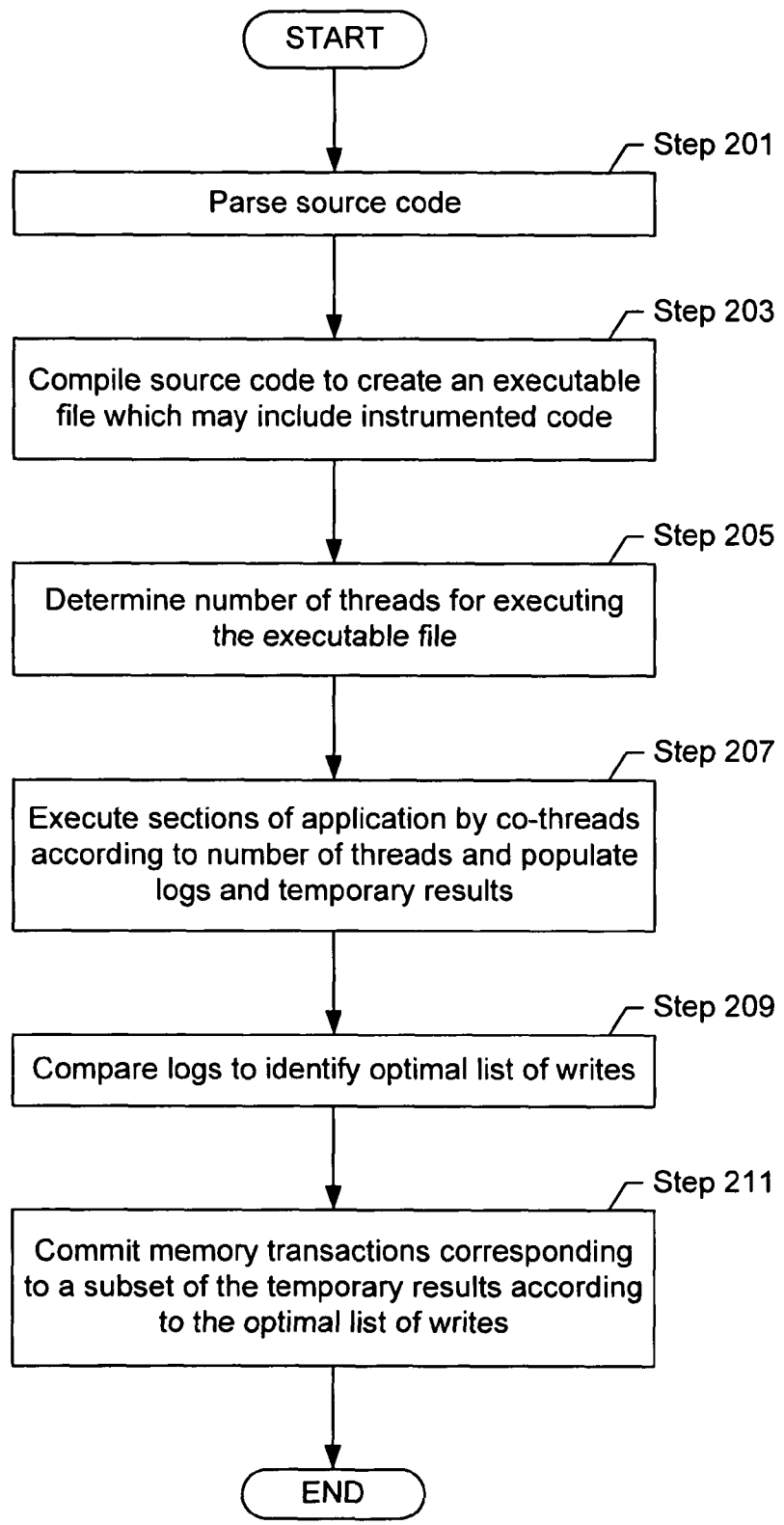
FIG. 3 shows a flowchart of a method for committing transactions in an application for a distributed computer system in accordance with one embodiment of the invention.

FIG. 3 shows a flowchart of a method for committing transactions in an application in a distributed computer system in accordance with one embodiment of the invention. Initially, the source code is parsed (Step 201). Next, the parsed source code is compiled to create an executable file which may include instrumented code (Step 203). Alternatively, in one or more embodiments of the invention, after the executable file is created, a runtime parser may create instrumented code (not shown). Alternatively, a hardware component may create the instrumented code and perform the aforementioned functionality of the runtime parser.

After the code is compiled, the number of threads that are to execute the executable code (or a portion thereof) in parallel is determined (Step 205). The number of threads may be specified in the code or input as parameters during execution of the application. Further, in one or more embodiments of the invention, the number of threads may be determined during runtime by the runtime system depending on the resources available at the time in the system.

After determining the number of threads to execute the executable file, the sections of the application are executed by the co-threads according to the number determined. Next, the logs and temporary results are populated (Step 207). Specifically, at this stage, the co-threads are initiated according to the determined number and assigned to particular sections of the application. While executing the sections of the application, the logs are populated (e.g., by the co-threads) and the temporary results are created. In one or more embodiments of the invention, for each memory location that is written to, (i.e., modified through a delete, adding a value, changing a value, etc.) only one entry exists per co-thread in the co-thread's temporary results and in the co-thread's logs. Thus, a co-thread that repetitively writes to the same memory location replaces the value in the temporary results in accordance with one or more embodiments of the invention.

Either during or after the execution of the section of the application by the co-threads, the logs are compared in order to identify the optimal list of writes (Step 209). Specifically, in one or more embodiments of the invention, the writes in different logs are compared to identify writes to the same memory locations in different logs. In one or more embodiments of the invention, writes to the memory location that are in a sequentially later log and valid are added to the optimal list of writes. While multiple methods exist for comparing logs, one method for comparing logs is described below and shown in FIG. 4.

Continuing with FIG. 3, once the optimal list of writes is identified, then the memory transactions corresponding to a subset of the temporary results are committed according to the optimal list of writes (Step 211). Specifically, at this stage, each temporary result that corresponds to a write in the optimal list of writes is committed. Committing temporary results may be performed using techniques well known in the art.

Those skilled in the art will appreciate that while FIG. 3 shows one method for executing section(s) of an application, any number of other methods may be used that generate temporary results and logs.

Figure 4:
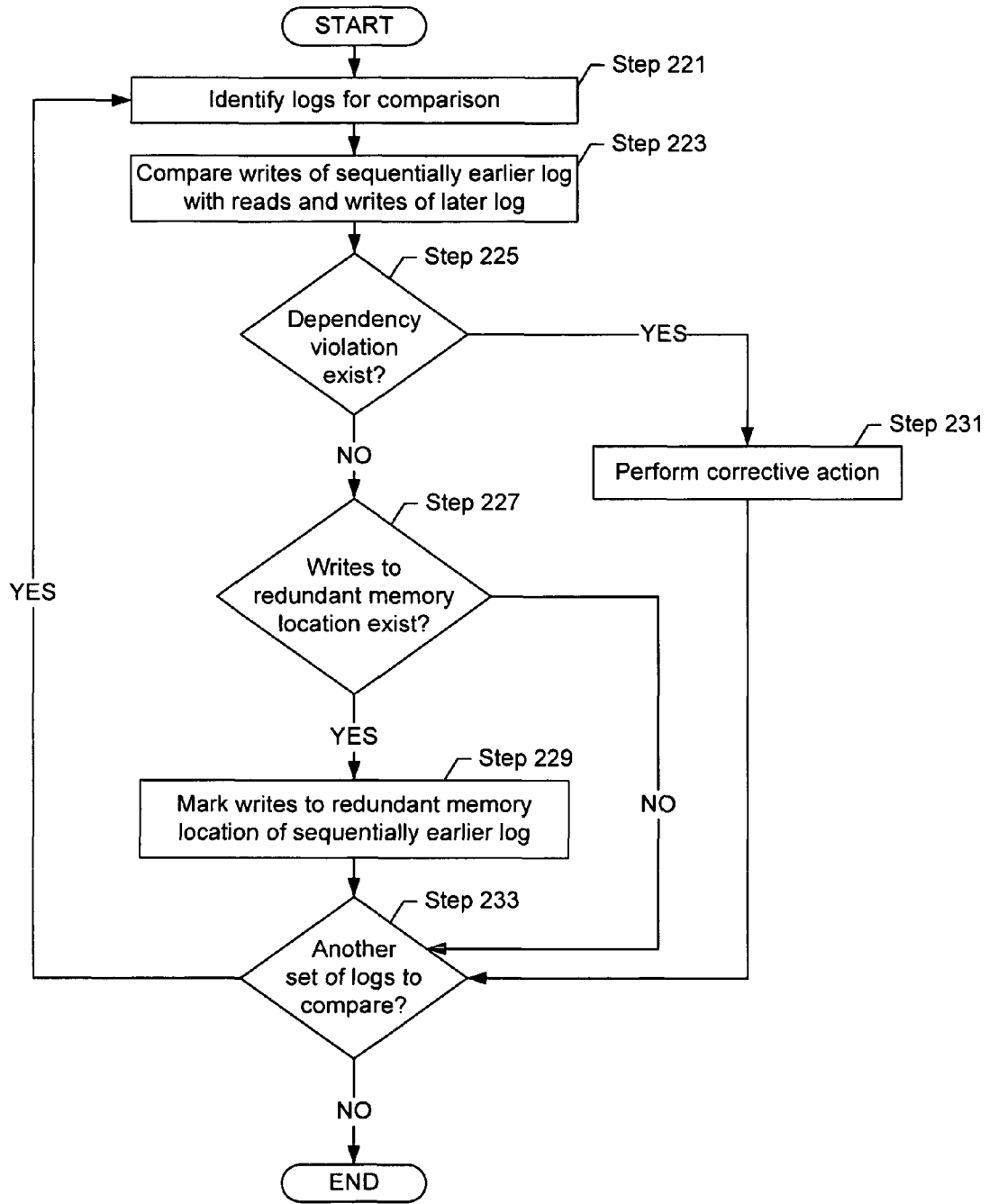
FIG. 4 shows a flowchart of a method to compare logs in accordance with one or more embodiments of the invention.

FIG. 4 shows a flowchart of a method to compare logs in accordance with one or more embodiments of the invention. Initially, logs are identified for comparison (Step 221). Specifically, at this stage, if more than one evaluator exists, then each evaluator identifies logs that the evaluator is responsible to compare. Assigning evaluators to logs may be performed in virtually any manner using virtually any technique known in the art. For example, the evaluators may be assigned to compare a subset of the logs, assigned to compare a combination of the logs, assigned according to a hierarchy, etc. Further, at this stage, an evaluator may identify a subset, such as a pair of logs, which the evaluator is assigned to compare.

Once the logs are identified, the writes of the sequentially earlier log are compared with the reads and writes of the sequentially later log (Step 223). In particular, the memory locations of the writes of the sequentially earlier log are compared with the memory location of the reads and writes listed in the sequentially later log. Comparing the writes in the sequentially earlier log with the reads and writes in the sequentially later log is performed to check for both redundant writes and dependency violations. Those skilled in the art will appreciate that if only redundant writes are checked for, then only the writes of the later log need to be compared to the writes of the earlier log.

However, if reads and writes of the sequentially later log are compared to the writes of the earlier log, then a determination is made whether a dependency violation exists (Step 225). In one or more embodiments of the invention, a dependency violation exists when a write to a memory location exists in the earlier log and a read to the same memory location exists in the later log.

For example, consider the scenario in which co-thread 1 executes the first three iterations of a loop and co-thread 2 executes the last three iterations of the loop. In the example, in the first iteration, co-thread 1 may be required to write to memory location A and co-thread 2 may be required to read from memory location A. In such scenario, because co-thread 1 does not commit transactions, the value that co-thread 2 reads from memory location A is not the correct value (i.e., the value that co-thread 1 wrote) in accordance with one or more embodiments of the invention. Accordingly, a dependency violation exists.

An earliest location of the dependency violation may be determined as the location of the read in accordance with one or more embodiments of the invention. Specifically, in one or more embodiments of the invention, because the write performs the change to the memory location, the write to the memory location is deemed correct.

If a dependency violation does not exist, then a determination is made whether redundant writes exist (Step 227). Specifically, a determination is made whether the identified logs specify the same memory location for a write. Those skilled in the art will appreciate that determining whether redundant writes exists may be performed while determining whether a dependency violation exists.

If a dependency violation exists, then the writes to the redundant memory location are marked in the sequentially earlier log (Step 229). Marking the writes may be performed with configurable specificity in accordance with one or more embodiments of the invention. Specifically, the writes may be marked with a boolean value to indicate that a later write exists, with the location of the later write (e.g., an identifier of the log of the later write and/or a position in the log of the later write, etc.). Further, in one or more embodiments of the invention, the writes to the earlier memory location may be marked with indicators specifying all logs of later writes to the same memory location. When marking writes with only a boolean value, then the marking may occur without synchronization in accordance with one or more embodiments of the invention. However, when marking with the earliest location of the later write and the functions of the evaluator is performed by multiple threads, an atomic update to the log may be required in accordance with one or more embodiments of the invention.

Those skilled in the art will appreciate that rather than marking writes to the same memory location in the sequentially earlier log, writes to sequentially later logs may be marked to indicate that the sequentially later log is to be added to the optimal list.

If, alternatively, a dependency violation is found to exist, then a corrective action may be performed (Step 231). Specifically, the necessary actions may be performed to address the dependency violation. The necessary action may include identifying the earliest location of the dependency violation. The earliest location of the dependency violation may be identified as the read of the sequentially later log. In one or more embodiments of the invention, temporary results performed before the earliest location of dependency violation may be committed, while the temporary results corresponding to the execution of the section at or after the earliest location are re-executed. Accordingly, the logs that are marked may be adjusted to reflect the writes that some writes after the re-execution may no longer be redundant.

Re-executing the co-threads may be performed in serial or in parallel. Specifically, at this stage a determination may be made as to whether a performance gain may be attained by parallelizing the sections. If the sections are parallelizable, then execution of the sections may be re-initiated using the co-threads. Alternatively, the sections may be executed in serial.

Once the corrective action is performed or after any redundant writes are marked, then a determination is made whether another set of logs to compare exists (Step 233). If another set of logs to compare exists, then the next set of logs for comparison are identified (Step 221).

After the logs are compared, then the optimal list of writes is identified from the logs. Specifically, the writes that are marked are inherently not in the optimal list of writes in accordance with one or more embodiments of the invention. Thus, each write in the optimal list of writes may remain in the same log and in the same memory location when the optimal list of writes is identified in accordance with or more embodiments of the invention.

Those skilled in the art will appreciate that while FIG. 4 shows a serial implementation for comparing logs, a parallel implementation may also be performed.

Further, while FIG. 4 shows one method for comparing logs, those skilled in the art will appreciate that a multitude of mechanisms exist for comparing logs. For example, the writes in the logs may be ordered into a single list in which each write in the single list has an identification of the log of the write. The write to a memory location that identifies the sequentially latest log for the memory location may be added to the optimal list.

Figure 5:
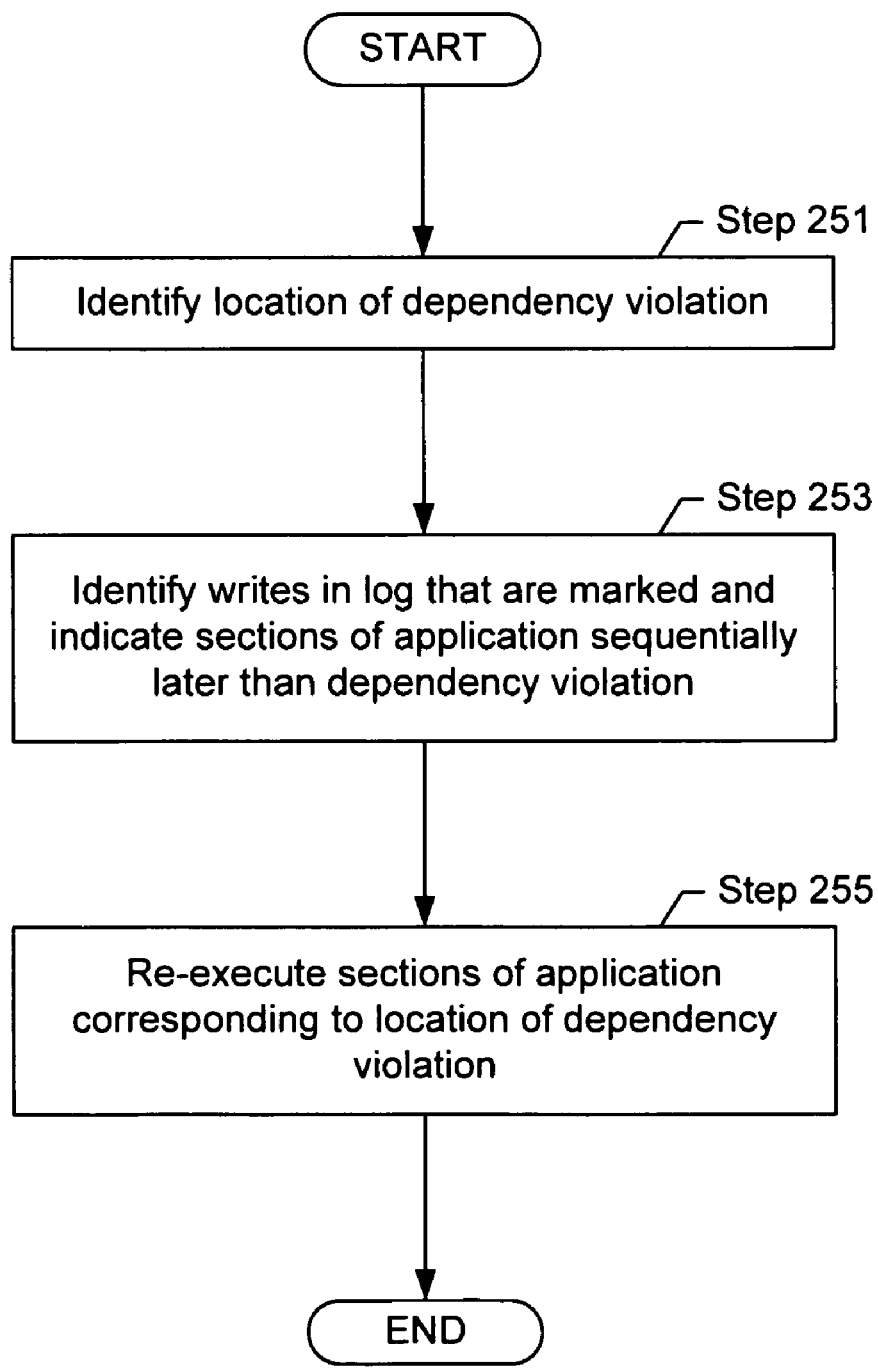
FIG. 5 shows a flowchart of a method for performing a corrective action if a dependency violation is discovered in accordance with one or more embodiments of the invention.

FIG. 5 shows a flowchart of a method for performing a corrective action if a dependency violation is discovered in accordance with one or more embodiments of the invention. Specifically, FIG. 5 shows a method for adjusting the writes that are added to the optimal list of writes when a dependency violation is discovered. In one or more embodiments of the invention, the adjustment to the writes that are added to the optimal list requires that the redundant writes in earlier logs are marked with identifiers of the logs and/or locations in the logs of the sequentially later writes.

Initially, the location of the dependency violation is identified (Step 251). The earliest location of the dependency violation may be identified as the first read to a memory location that is shown as previously written to in a sequentially earlier log. For example, if a first log specifies a write to memory location X, the second log specifies a read to memory location X, and a third log specifies a read to memory location X, then the location of the dependency violation may be determined as the read of the second log that specifies the memory location X. Specifically, because the read may be incorrect, all instructions that are performed sequentially after the read may be incorrect as well.

After identifying the location of the dependency violation, Identify writes in log that are marked and indicate sections of application that are sequentially later than dependency violation are identified (Step 253). Specifically, if a write is marked with an identifier for any log or write sequentially after the dependency violation, then the write may now be committed.

Once all writes are marked, then the sections of the application that correspond to instructions after the dependency violation are re-executed (Step 255). Re-executing sections of the application may be performed as described above.

Thus, as shown in FIG. 5, if the redundant writes are marked in such a manner as to identify the logger and the timestamp, then when a dependency violation is discovered, the logs may be adjusted accordingly.

In the following example, consider the scenario in which an application has a speculatively parallelized loop defined as:
for (int i=0; i<15; i++)
    A[B[i]]=A[C[i]];

Assume, for the purposes of the example, that the values of array A, array and array C as shown in the following table:

TABLE 1

Values of Array A, Array B, and Array C

| i | A[i] | B[i] | C[i] |
|---|------|------|------|
| 0 | 100 | 0 | 1 |
| 1 | 110 | 1 | 2 |
| 2 | 120 | 2 | 3 |
| 3 | 130 | 11 | 4 |
| 4 | 140 | 4 | 5 |
| 5 | 150 | 5 | 6 |
| 6 | 160 | 6 | 7 |
| 7 | 170 | 7 | 8 |
| 8 | 180 | 8 | 9 |
| 9 | 190 | 0 | 10 |
| 10 | 200 | 5 | 12 |
| 11 | 210 | 9 | 11 |
| 12 | 220 | 3 | 13 |
| 13 | 230 | 10 | 14 |
| 14 | 240 | 0 | 4 |

Further, in the example, consider the scenario in which three co-threads (i.e., co-thread 0, co-thread 1, co-thread 2) are used for the speculative parallelism. In the example, co-thread 0 executes the section defined by i=0 to i=4 iterations of the loop, co-thread 1 executes the section defined by i=5 to i=9 iterations of the loop, and co-thread 2 executes the section defined by i=10 to i=14 iterations of the loop. For the purposes of the example, consider the case in which each co-thread executes at the same rate. Those skilled in the art will appreciate that in use, such scenario may not be the case and this invention should not be limited to this example. In addition, consider the scenario in which when the logs list the writes, the logs also indicate the values of the writes being written. Therefore, a separate set of values for temporary results is not required. Further, in the example, each co-thread is also a thread of the evaluator. Specifically, at the end of execution, each co-thread is assigned to compare the co-thread's logs with sequentially later logs.

In one or more embodiments of the invention, the execution of the co-threads may proceed and create the logs as shown in the following table:

TABLE 2

Logs of the co-threads 0, 1, and 2

| Timestamp Value | Log 0 read | Log 0 Write | Log 1 read | Log 1 Write | Log 2 read | Log 2 Write |
|---|---|---|---|---|---|---|
| 1 | A[1] | A[0] = 110 | A[6] | A[5] = 160 | A[12] | A[5] = 220 |
| 2 | A[2] | A[1] = 120 | A[7] | A[6] = 170 | A[11] | A[9] = 210 |
| 3 | A[3] | A[2] = 130 | A[8] | A[7] = 180 | A[13] | A[3] = 230 |
| 4 | A[4] | A[11] = 140 | A[9] | A[8] = 190 | A[14] | A[10] = 240 |
| 5 | A[5] | A[4] = 150 | A[10] | A[0] = 200 | A[4] | A[0] = 140 |

Accordingly, in one or more embodiments of the invention, the comparison proceeds as follows. Co-thread 0 compares log 0 with the logs of co-thread 1 and co-thread 2 (i.e., log 1 and log 2, respectively). Further, co-thread 1 compares log 1 with log 2 and co-thread 2 does not perform any comparisons. Thus, without performing any actions, co-thread 2 has completed the comparison.

Co-thread 1 starts with the write to A[5] from timestamp 1 and searches in the log of co-thread 2. Because co-thread 2 wrote to A[5] in timestamp 1, co-thread 1 marks A[5] in timestamp 1 as no-commit in log 1 with the indication of log 2, timestamp 1. Then co-thread 1 progresses to the write of A[6]. Because co-thread 2 did not write to memory location A[6] nor read from A[6], redundant writes or dependency violations are not found. Similarly, co-thread 1 does not find redundant writes or dependency violations for writes to A[7] and A[8]. Thus, A[6], A[7], and A[8] remain unmarked. However, for the write in timestamp 5 to A[0], co-thread 2 also wrote to memory location A[0] in timestamp 5. Accordingly, co-thread 1 marks write to A[0] in timestamp 5 as a redundant write with log 2, timestamp 5. Therefore, the log 1 of Co-thread 1 after the aforementioned comparisons may appear as follows:

TABLE 3

Log 1 of co-thread 1

| Log 1 read | Log 1 Write | No-commit |
|---|---|---|
| A[6] | A[5] = 160 | Log 2, Timestamp 1 |
| A[7] | A[6] = 170 | |
| A[8] | A[7] = 180 | |
| A[9] | A[8] = 190 | |
| A[10] | A[0] = 200 | Log 2, Timestamp 5 |

In one or more embodiments of the invention, while co-thread 1 and co-thread 2 are performing the aforementioned comparisons, co-thread 0 is also comparing the logs against co-thread 1 and co-thread 2. In timestamp 1, the write to A[0] is redundant with log 1 timestamp 5. Thus, the write in timestamp 1 is marked as a no-commit with Log 1, timestamp 5. Further, co-thread 0 continues with the rest of the writes (i.e., A[1], A[2], A[11], and A[4]), but redundant writes and dependency violations are not found when comparing with log 1. Accordingly, in one or more embodiments of the invention, the log of co-thread 0 after performing the comparison against the log 1 will look as follows:

TABLE 4

Log 0 of co-thread 0

| Log 0 read | Log 0 Write | No-commit |
|---|---|---|
| A[1] | A[0] = 110 | Log 1, Timestamp 5 |
| A[2] | A[1] = 120 | |

TABLE 4-continued

| | Log 0 of co-thread 0 | |
|---|---|---|
| Log 0 read | Log 0 Write | No-commit |
| A[3] | A[2] = 130 | |
| A[4] | A[11] = 140 | |
| A[5] | A[4] = 150 | |

Next, co-thread 0 compares log 0 with log 2. Because co-thread 0 has already compared the write to A[0] with log 1 and has marked A[0] in log 0 as no-commit because of log 1, co-thread 2 does not remark A[0] in log 0. Specifically, as shown in the example, if the existing mark is less than or equal to the new mark, then the existing mark is kept. Otherwise, the new mark is stored in accordance with one or more embodiments of the invention. For the writes in timestamp 2 and 3 to A[1] and A[2], a redundant write and dependency violation is not found. However, for the write in timestamp 4 to A[11], co-thread 0 finds a read-after-write dependency violation which invalidates the results produced by co-thread 2 in timestamp 2. Co-thread 0, may further compare and identify the dependency violation on A[4] with log 2, timestamp 5.

At this stage, a corrective action may be performed. One possible corrective action is to discard all results and execute the portion of the application in serial. Another corrective action is to discard the no-commit results in all logs and the temporary results from co-thread 2, and re-execute co-thread 2 from timestamp 2 and after committing the results from co-thread 0 and co-thread 1. However, because in this scenario, when marking the no-commit with the log and the timestamp of the lowest redundant write, the optimal list of writes may be adjusted. Specifically, all results in log 1 and log 0 that are marked with no-commit after log 1 timestamp 2, are unmarked. Thus, the logs for the writes in log 0, log 1, and log 2 may appear as follows after performing the rollback.

TABLE 5

| | | Logs after comparison | | | |
|---|---|---|---|---|---|
| Log 0 Write | No-commit | Log 1 Write | No-commit | Log 2 Write | No-commit |
| A[0] = 110 | Log 1, Timestamp 5 | A[5] = 160 | Log 2, Timestamp 1 | A[5] = 220 | |
| A[1] = 120 | | A[6] = 170 | | | |
| A[2] = 130 | | A[7] = 180 | | | |
| A[11] = 140 | | A[8] = 190 | | | |
| A[4] = 150 | | A[0] = 200 | Log 2, Timestamp 5 | | |

After completing the comparison of the logs, co-thread 0, co-thread 1, and co-thread 2 can commit the optimal list of writes without synchronization and in parallel. The following table shows the optimal list of writes that each co-thread can commit.

TABLE 6

| Optimal List of Writes | | |
|---|---|---|
| Co-thread 0 commit | Co-thread 1 commit | Co-thread 2 commit |
| A[1] = 120 | A[6] = 170 | A[5] = 220 |
| A[2] = 130 | A[7] = 180 | |
| A[11] = 140 | A[8] = 190 | |
| A[4] = 150 | | |

After committing the above results, co-thread 2 re-executes and commits the results from re-execution. As shown in the example, only those writes in the logs which do not have a no-commit mark update the program state. Further as shown in the example, for any given memory location specified in the sections of the application that are executed, at most one write exists not marked as no-commit in all the logs. Accordingly, the commit phase can be safely executed in parallel, without synchronization, and without violating the sequential semantics of the original application in accordance with one or more embodiments of the invention.

Figure 6:
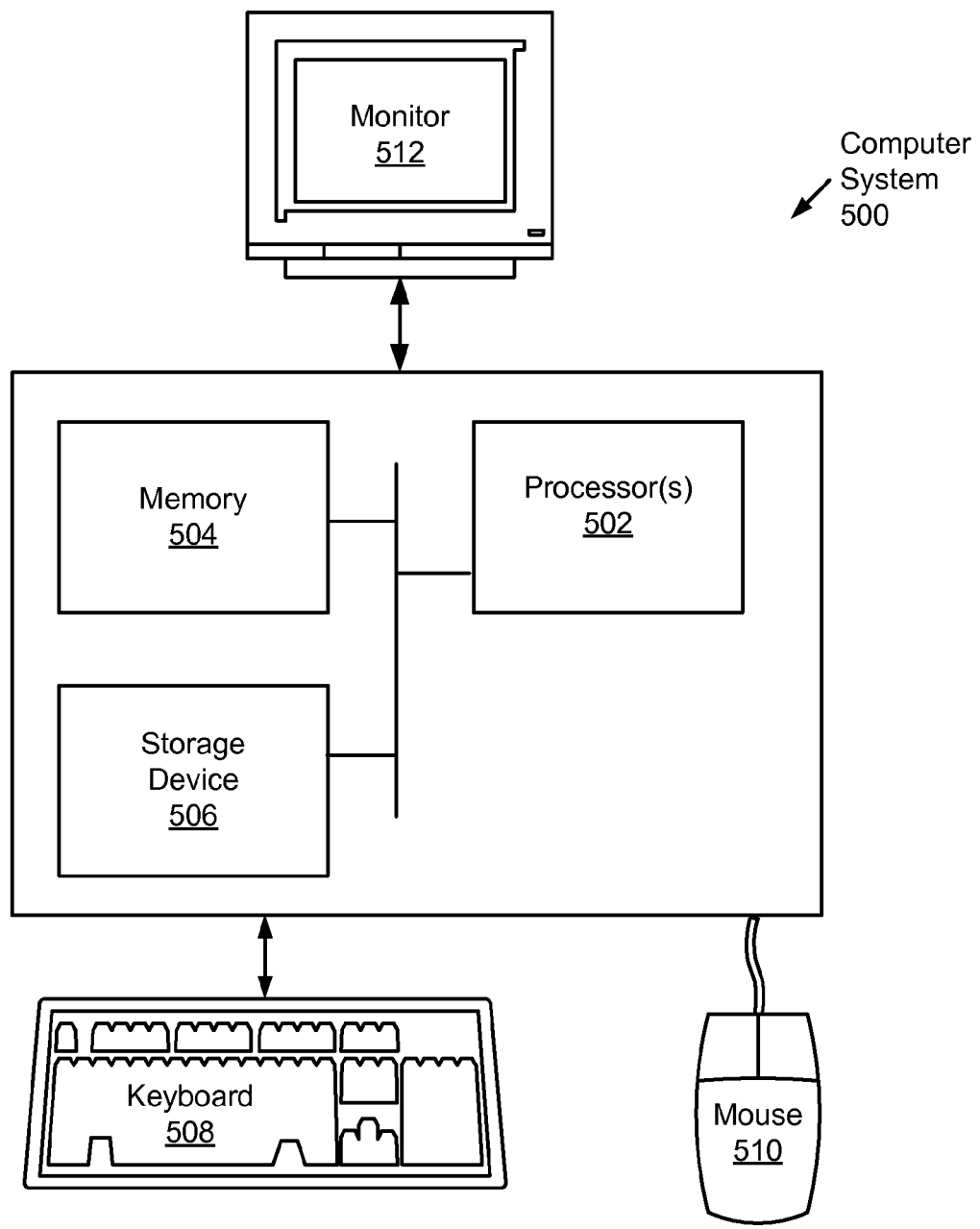
FIG. 6 shows a computer system in accordance with one embodiment of the invention.

The invention may be implemented on virtually any type of computer regardless of the platform being used. For example, as shown in FIG. 6, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., evaluator, logs, co-threads, etc.) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

One or more embodiments of the invention provide a mechanism for realizing the performance gain by committing in parallel and without synchronization only an optimal number of writes. Thus, one or more embodiments of the invention avoid the overhead of sequential execution, synchronization, and overhead associated with repetitively modifying the same memory location when only the last modification is of consequence. Further, by avoiding committing multiple transactions to the same memory location, embodiments of the invention may commit the transactions in parallel.

In addition, when identifying an optimal number of writes, one or more embodiments of the invention realize an additional performance gain when a dependency violation is found. Specifically, in one or more embodiments of the invention, a mechanism is provided to rollback the determination of the optimal list of writes. Thus, writes to a memory location that are marked so as to not be committed may be unmarked when it is determined that later writes are invalid.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for committing memory transactions in an application comprising:
    compiling the application to create executable code, wherein compiling the application comprises:
        flagging, in the application, an indeterminable variable to create a flagged indeterminable variable, wherein the indeterminable variable prevents parallelization of the application at compile time,
    parsing the executable code to create instrumented code, wherein parsing the executable code comprises:
        dividing the executable code into a plurality of sections for processing by a plurality of co-threads, and
        enabling, in the instrumented code, logging of memory transactions associated with the flagged indeterminable variable during execution of the plurality of sections;
    executing the plurality of sections of the application in parallel;
    creating a first plurality of temporary results, wherein the first plurality of temporary results is created from executing a first section of the plurality of sections;
    creating a first log, wherein the first log comprises a first plurality of memory transactions associated with the flagged indeterminable variable that occur during execution of the first section, wherein the first plurality of memory transactions comprises a first plurality of writes to a first memory location in the first plurality of temporary results;
    replacing a value in the first plurality of temporary results when executing the first section comprises first repetitive writes to the first memory location in the first plurality of temporary results;
    creating a second plurality of temporary results, wherein the second plurality of temporary results is created from executing a second section of the plurality of sections;
    creating a second log, wherein the second log comprises a second plurality of memory transactions that occur during execution of the second section, wherein the second plurality of memory transactions comprises a second plurality of writes to a second memory location in the second plurality of temporary results;
    replacing a value in the second plurality of temporary results when executing the second section comprises second repetitive writes to the second memory location in the second plurality of temporary results;
    comparing, after executing the first section and the second section, the first log with the second log to:
        identify an optimal list of writes from the first plurality of writes and the second plurality of writes, and
        determine whether a dependency violation exists; and
    committing, when the dependency violation does not exist, memory transactions corresponding to a subset of the first plurality of temporary results and a subset of the second plurality of temporary results, wherein the subset of the first plurality of temporary results and the subset of the second plurality of temporary results is identified by the optimal list of writes,
    wherein committing memory transactions occurs after executing the plurality of sections in parallel.

2. The method of claim 1, wherein committing memory transactions corresponding to the subset of the first plurality of temporary results and to the subset of the second plurality of temporary results is performed in parallel.

3. The method of claim 1, wherein comparing the first log with the second log comprises:
    comparing the first log with the second log to identify a list of redundant writes, wherein the first log is sequentially earlier than the second log; and
    marking writes in the first log corresponding to the list of redundant writes to obtain marked writes, wherein the marked writes are not in the optimal list of writes.

4. The method of claim 3, wherein marking writes comprises setting an indicator on each of the marked writes.

5. The method of claim 4, wherein the indicator identifies the second log.

6. The method of claim 4, wherein setting an indicator on each of the marked writes comprises replacing an identifier of a third log with an indicator identifying the second log, wherein the third log is obtained by executing the plurality of sections, and the third log is sequentially later than the second log.

7. The method of claim 1, further comprising:
    logging a third plurality of memory transactions that occur while executing the plurality of sections to obtain a third log and a third plurality of temporary results, wherein the third plurality of temporary results comprises a third plurality of writes;
    re-executing a subset of the plurality of sections after determining that the dependency violation exists between a plurality of writes in the first log and a plurality of reads in the second log, wherein the first log is sequentially earlier than the second log; and; and
    committing updated memory transactions based on an indicator of the writes, wherein the indicator identifies at least one selected from the group consisting of the second log and the third log.

8. The method of claim 1, wherein the plurality of sections spans at least one selected from the group consisting of options in at least one conditional expression of the application and a plurality of method invocations of the application.

9. A system for committing transactions in an application executing on a processor comprising:
    a static compiler configured to:
        compile the application to create executable code, wherein compiling the application comprises:
            flagging, in the application, an indeterminable variable to create a flagged indeterminable variable, wherein the indeterminable variable prevents parallelization of the application at compile time,
    a runtime parser configured to:
        parse the executable code to create instrumented code, wherein parsing the executable code comprises:
            dividing the executable code into a plurality of sections for processing by a plurality of co-threads, and
            enabling, in the instrumented code, logging of memory transactions associated with the flagged indeterminable variable during execution of the plurality of sections;
    the plurality of sections of the application, wherein the plurality of sections execute on the processor in parallel;
    a first plurality of temporary results stored in a memory, wherein the first plurality of temporary results is created from executing a first section of the plurality of sections;
    a first log stored in the memory and comprising:
        a first plurality of memory transactions associated with the flagged indeterminable variable that occur during execution of the first section, wherein the first plurality of memory transactions comprises a first plurality of writes to a first memory location in the first plurality of temporary results, wherein a value in the first plurality of temporary results is replaced when executing the first section comprises first repetitive writes to the first memory location in the first plurality of temporary results;

a second plurality of temporary results stored in the memory, wherein the second plurality of temporary results is created from executing a second section of the plurality of sections;

a second log stored in the memory and comprising:
  a second plurality of memory transactions associated with the flagged indeterminable variable that occur during execution of the second section, wherein the second plurality of memory transactions comprises a second plurality of writes to a second memory location in the second plurality of temporary results, wherein a value in the second plurality of temporary results is replaced when executing the second section comprises second repetitive writes to the second memory location in the second plurality of temporary results; and an evaluator executing on the processor and configured to:
  compare, after executing the first section and the second section, the first log with the second log to:
    identify an optimal list of writes from the first plurality of writes and the second plurality of writes, and
    determine whether a dependency violation exists; and
  commit, when the dependency violation does not exist, memory transactions corresponding to a subset of the first plurality of temporary results and the second plurality of temporary results, wherein the subset of the first plurality of temporary results and the second plurality of temporary results is identified by the optimal list of writes,
  wherein committing memory transactions occurs after executing the plurality of sections.

10. The system of claim 9, wherein committing the subset of the first plurality of temporary results and the second plurality of temporary results is performed in parallel.

11. The system of claim 9, wherein comparing the first log with the second log comprises:
  comparing the first log with the second log to identify a list of redundant writes, wherein the first log is sequentially earlier than the second log; and
  marking writes in the first log corresponding to the list of redundant writes to obtain marked writes, wherein the marked writes are not in the optimal list of writes.

12. The system of claim 11, wherein marking writes comprises setting an indicator on each of the marked writes.

13. The system of claim 12, wherein the indicator identifies the second log.

14. The system of claim 12, wherein setting the indicator on each of the marked writes comprises replacing an identifier of a third log with an indicator identifying the second log, wherein the third log is obtained by executing the plurality of sections, and the third log is sequentially later than the second log.

15. The system of claim 9, wherein the evaluator is further configured to:
  commit updated memory transactions based on an indicator of the writes, wherein the indicator identifies at least one selected from the group consisting of the second log and a third log, wherein the third log is obtained by executing the plurality of sections, and the third log is sequentially later than the second log.

16. The system of claim 9, wherein the plurality of sections span at least one selected from the group consisting of options in at least one conditional expression of the application and a plurality of method invocations of the application.

17. The system of claim 9, wherein the plurality of sections span a plurality of iterations in a loop of the application.

18. A distributed computer system having a plurality of nodes for performing a method comprising:
  compiling an application to create executable code, wherein compiling the application comprises:
    flagging, in the application, an indeterminable variable to create a flagged indeterminable variable, wherein the indeterminable variable prevents parallelization of the application at compile time,
  parsing the executable code to create instrumented code, wherein parsing the executable code comprises:
    dividing the executable code into a plurality of sections for processing by a plurality of co-threads, and
    enabling, in the instrumented code, logging of memory transactions associated with the flagged indeterminable variable during execution of the plurality of sections;
  executing the plurality of sections of the application in parallel;
  creating a first plurality of temporary results, wherein the first plurality of temporary results is created from executing a first section of the plurality of sections;
  creating a first log, wherein the first log comprises a first plurality of memory transactions associated with the flagged indeterminable variable that occur during execution of the first section, wherein the first plurality of memory transactions comprises a first plurality of writes to a first memory location in the first plurality of temporary results;
  replacing a value in the first plurality of temporary results when executing the first section comprises first repetitive writes to the first memory location in the first plurality of temporary results;
  creating a second plurality of temporary results, wherein the second plurality of temporary results is created from executing a second section of the plurality of sections;
  creating a second log, wherein the second log comprises a second plurality of memory transactions that occur during execution of the second section, wherein the second plurality of memory transactions comprises a second plurality of writes to a second memory location in the second plurality of temporary results;
  replacing a value in the second plurality of temporary results when executing the second section comprises second repetitive writes to the second memory location in the second plurality of temporary results;
  comparing, after executing the first section and the second section, the first log and the second log to:
    identify an optimal list of writes from the first plurality of writes and the second plurality of writes, wherein the optimal list of write comprises non-redundant writes, and
    determine whether a dependency violation exists; and
  committing, when the dependency violation does not exist, memory transactions corresponding to a subset of the first plurality of temporary results and the second plurality of temporary results, wherein the subset of the first plurality of temporary results and the second plurality of temporary results is identified by the optimal list of writes, wherein the plurality of nodes comprises at least one processor, and wherein committing memory transactions occurs after executing the plurality of sections.

19. The distributed computer system of claim 18, wherein the method further comprises:

logging a third plurality of memory transactions that occur while executing the plurality of sections to obtain a third log and a third plurality of temporary results;

re-executing a subset of the plurality of sections after determining that the dependency violation exists between a plurality of writes in the first log and a plurality of reads in the second log; and committing updated memory transactions based on an indicator of the writes, wherein the indicator identifies at least one selected from the group consisting of the second log and the third log.

* * * * *